(12) United States Patent
Murphy et al.

(10) Patent No.: US 7,832,038 B2
(45) Date of Patent: Nov. 16, 2010

(54) FIRE RESISTANT BARRIER AND USE WITH MATTRESSES, MATTRESS FOUNDATIONS, AND UPHOLSTERED ARTICLES THEREIN

(75) Inventors: Harrison Robert Murphy, Great Falls, VA (US); Juraj Michal Daniel Slavik, II, McLean, VA (US)

(73) Assignee: Kickball Concepts, LLC, Great Falls, VA (US)

(*) Notice: Subject to any disclaimer, the term of this patent is extended or adjusted under 35 U.S.C. 154(b) by 764 days.

(21) Appl. No.: 11/737,551

(22) Filed: Apr. 19, 2007

(65) Prior Publication Data

US 2007/0249248 A1 Oct. 25, 2007

Related U.S. Application Data

(60) Provisional application No. 60/793,406, filed on Apr. 20, 2006.

(51) Int. Cl.
*A47C 27/00* (2006.01)
*B32B 9/00* (2006.01)

(52) U.S. Cl. .................. 5/698; 5/483; 5/702; 428/920; 428/102

(58) Field of Classification Search .............. 5/483, 5/698, 948, 951, 954, 691, 500, 502, 690; 428/102, 920, 76; 442/136, 417
See application file for complete search history.

(56) References Cited

U.S. PATENT DOCUMENTS

| | | | | |
|---|---|---|---|---|
| 1,371,754 A | * | 3/1921 | Gilcrest | 112/400 |
| 1,752,914 A | * | 4/1930 | Hugo | 112/475.01 |
| 2,624,894 A | * | 1/1953 | McCarthy | 5/698 |
| 2,801,427 A | * | 8/1957 | Crocker | 5/483 |
| 3,459,179 A | * | 8/1969 | Olesen | 601/134 |
| 3,486,563 A | * | 12/1969 | Cholin et al. | 169/26 |
| 3,958,286 A | * | 5/1976 | Rodinsky | 5/686 |
| 4,924,541 A | * | 5/1990 | Inagaki | 5/652.1 |
| 5,011,731 A | * | 4/1991 | Nakamori et al. | 428/222 |
| 5,032,446 A | * | 7/1991 | Sayles | 428/161 |
| 5,152,019 A | * | 10/1992 | Hirata | 5/655.4 |
| 5,522,105 A | * | 6/1996 | Fujiwara et al. | 5/644 |
| 5,584,086 A | * | 12/1996 | VanWinkle et al. | 5/644 |
| 6,058,536 A | * | 5/2000 | Henry | 5/691 |
| 6,983,805 B2 | * | 1/2006 | Chattaway | 169/46 |
| 7,013,514 B1 | * | 3/2006 | Byer | 5/698 |
| 7,484,256 B2 | * | 2/2009 | Murphy et al. | 5/698 |
| 2005/0095936 A1 | * | 5/2005 | Jones et al. | 442/136 |
| 2005/0166330 A1 | * | 8/2005 | Williams | 5/740 |
| 2007/0264893 A1 | * | 11/2007 | Mikaelian | 442/59 |

* cited by examiner

*Primary Examiner*—Michael Trettel
(74) *Attorney, Agent, or Firm*—Heslin Rothenberg Farley & Mesiti P.C.

(57) ABSTRACT

The invention relates to a fire resistant barrier and open flame resistant mattresses, mattress foundations, and upholstered articles having the fire resistant barrier therein for protection. The open flame resistance of the mattresses, mattress foundations, and upholstered articles is determined under a full-scale fire test of a composite article.

43 Claims, 5 Drawing Sheets

FIRE RESISTANT BARRIER AND USE WITH MATTRESSES, MATTRESS FOUNDATIONS, AND UPHOLSTERED ARTICLES THEREIN

CROSS-REFERENCE TO RELATED APPLICATIONS

This application claims priority from U.S. Provisional Application Ser. No. 60/793,406, filed Apr. 20, 2006, the entire contents of which are incorporated herein by reference.

TECHNICAL FIELD

The invention relates to a fire resistant barrier and open flame resistant mattresses, mattress foundations, and upholstered articles having the fire resistant barrier therein for protection.

BACKGROUND OF THE INVENTION

The number of injuries and fatalities associated with residential fires in which a mattress, upholstered article or other filled item was the first item ignited or where these products exacerbated a fire event has led to regulatory efforts to reduce the flammability of mattresses, upholstered articles and bedclothes used in homes and other occupancies.

The passage of Assembly Bill 603 by the California Legislature of Assembly on Aug. 13, 2001, required that all mattresses and sleep surfaces sold in the State of California since Jan. 1, 2005, meet an open flame resistance standard described in the state's Technical Bulletin #603 (TB 603). Regulation and enforcement of TB 603 have fallen to the state's Bureau of Home Furnishings and Thermal Insulation (BHFTI).

On, Feb. 16, 2006, the United States Consumer Products Safety Commission (CPSC) approved new a regulation for further reducing mattress flammability beyond the level required by the Cigarette Ignition Standards as codified in Part 1632 of the Code of Federal Regulations 16 (16 CFR 1632) (or formerly FF 4-72) since the 1970's. This regulation—16 CFR 1633—will be effective on Jul. 1, 2007.

Further, the CPSC is engaged in preparing and evaluating a bedclothes flammability standard as an adjunct to its mattress flammability work. This work has been announced in the Federal Register Advance Notice of Public Rule Making (ANPR) published Jan. 13, 2005 (Volume 70, Number 9 Page 2514) and is proposed as 16 CFR 1634.

The topic of "bedclothes flammability" is also under scrutiny by the State of California under the BHFTI Technical Bulletin #604 (TB 604) which is presently in draft form as published on Oct. 1, 2004, and pending final comment, revision, approval and enactment into law as of July 2005.

Both the CPSC and the BHFTI have been engaged in the process of evaluating improved degrees of furniture flammability performance. The BHFTI work is exemplified in its efforts to revise the testing requirements found in California Technical Bulletin #117 (TB 117). The present CPSC work initially commenced in 1994 with the publication of an Advanced Notice of Public Rulemaking (ANPR) to initiate regulatory proceedings under the Federal Flammable Fabrics Act (FFA) covering the principal fire risks to upholstered furniture; ignition by smoldering cigarettes and ignition by small open flame sources (e.g., lighters, matches and candles). In May 2005, the CPSC published a Staff Draft Standard for Upholstered Furniture Flammability in preparation for issuing a new ANPR on upholstered furniture flammability, which is expected to occur in 2006.

Numerous international and maritime standards also exist for the evaluation of mattresses, bedding sets, upholstered furniture and filled articles. Among these are British Standard (BS) 5852 Part 1, BS 5852 Part 2, BS 5852: 1990 Section 4, BS 5852: 1990 Section 5, BS 6807:1986, BS 7176, BS EN 1021-1, BS EN 1021-2, BS EN 597-1, BS EN 597-2, BS 7175, BS EN ISO 12952: Parts 1-4, International Maritime Organisation Method (IMO) A 652 (16) for upholstered furniture, and IMO A 652 (17) for bedding, as well as their material equivalents that have been adopted by various countries throughout the world.

The new standards for flammability of residential mattresses and upholstered furniture embodied in California TB 603, the revisions to California TB 117, the new 16 CFR 1633 regulation and the CPSC draft language on furniture have added to the realm of flammability testing protocols previously unavailable for the design of products targeted for institutional applications. Institutional settings, such as healthcare, dormitory and corrections, have used California Technical Bulletin #121 (TB 121), California Technical Bulletin #129 (TB 129), Boston Fire Department IX-11, ASTM E-1590, Underwriters Laboratory (UL) 1895, and National Fire Protection Association (NFPA) 267, to assess performance of full-scale composite mattresses and mattress foundations against open flame ignition sources.

California Technical Bulletin #133 (TB 133), ASTM E-1537 and NFPA 266 have been used to assess performance of full-scale composite furniture items and mock-ups against open flame ignition sources. NFPA 701, California TB 117, NFPA 260, NFPA 261, 16 CFR 1632, and UL 1975 have been used to assess small scale performance of component materials used in mattresses, furniture and filled articles against small open flames and smoldering cigarette ignition sources.

Institutional bedding installations typically require only a mattress and no foundation. Such mattresses usually comprise a solid core of polyurethane foam, latex foam or other foam composition, all of which may be combustion modified to some degree. Many of the components used in institutional mattresses and sleep support surfaces, including fill materials and covering fabrics, are subject to performance testing according to test criteria such as NFPA 701 and California TB 117.

Such requirements for full scale, open flame resistant performance in mattresses, mattress foundations, bedclothes, upholstered articles, and other similarly filled articles comprising resilient cushioning materials have created new demands for performance oriented fire barrier systems and related materials.

One approach to reducing flammability of mattresses, mattress foundations, upholstered furniture and other filled articles, such as bedclothes, has been to treat standard fabrics used in their construction with chemical flame retardants. These chemical flame retardants are employed to cause fuel loads, such as fabrics and fillings, to combust at heat levels higher than untreated materials. However, these chemical treatments may be objectionable because of distasteful odors which are noticeable when in close contact with the materials, off-gassing of obnoxious elements, stiffness of the treated fabric which may compromise the comfort of the finished mattress or mattress foundation, and the potential temporary durability of such treatments which may compromise the long term protection from open-flame, smoldering ignition and radiant/thermal heat flux sources.

Additional objectionable traits of such topically applied chemicals may be consumer backlash and rejection of such treatments, out of concern for the toxic effects of such treatments on human health. This was evidenced by the public reaction and subsequent regulatory control to findings of a flame retardant PBDE in human tissue and breast milk, and the potential adverse effects on the environment as the chemicals progress through the product life cycle from manufacturing through use and ultimate disposal.

Another approach has been to create fire barrier fabrics made from standard fibers that are chemically treated with flame retardants prior to their formation into yarns and/or fabrics or to use inherently flame retardant fibers for the formation of yarns and/or fabrics that do not require topical application of flame retardant chemicals. Such fire barrier fabrics essentially work by isolating a fuel load (foam, fiber, cushioning, resilient filling materials, etc.) from the ignition source. Chemically treated flame retardant fibers used in textile articles or chemically treated finished textile items may be non-durable or durable in nature.

The use of inherent flame retardant fibers in the design of fire barrier and thermal insulation textiles and related materials has shown to be both effective in terms of performance and in terms of the marketing attributes associated with them. Many of these fibers are, however, costly and their use in items such as mattresses, mattress foundations, upholstered furniture articles and other articles filled with resilient cushioning materials places a potentially high economic burden on consumers seeking to purchase such items.

The manufacturing processes of fibrous materials or the chemical treatment presently used in the fabrication of fire barrier materials is also costly—both in economic terms and in their potentially adverse environmental impact. The adverse environmental impacts arise from the consumption of non-renewable or limited available natural resources as well as the potentially toxic by-products and waste-products created by the manufacturing and treating processes.

Additionally, fiber based fire barrier textiles suffer from other potential limitations. In *NIST (National Institute of Standard and Technology) Technical Note* 1465: *A Study of size effects in the Fire Performance of Beds* (published January 2005), the entire contents of which are incorporated herein by reference, author Thomas Ohlemiller discusses fire barrier design methodologies in a Background Discussion of Fire Barriers that appears in the Note's Appendix A. Ohlemiller describes an ideal barrier design as being one that "would, at any point on its surface, never let enough heat through to the material inside to cause that material to gasify at all", but he asserts that cost "will generally preclude such a heat impermeable barrier." Preferred barrier material is described as having porosity but the pores must small enough to preclude "direct flame propagation" through the pores. The pore dimensions are described as "smaller than a millimeter or less". Ohlemiller continues to observe that many barriers are based on fibers that "char when heated" but that these char formations are prone to oxidation during flame exposure, which "erodes" them.

However, none of the above approaches are capable of imparting sufficient and consistent flame-retardant characteristics to the full breadth of styles and constructions of bedding such as mattresses and mattress foundations, upholstered furniture articles, and other articles filled with resilient cushioning. As a result, a need exists for new materials to protect bedding, upholstered furniture articles, and other articles from fire that overcome at least one of the aforementioned deficiencies.

SUMMARY OF THE INVENTION

An aspect of the present invention relates to a substantially flat fire resistant barrier comprising: a textile structure having a plurality of chambers; and at least one flame resistant granular filling within the chambers.

A second aspect of the present invention relates to an open flame resistant mattress comprising the fire resistant barrier described above enclosing a core of the mattress.

A third aspect of the present invention relates to an open flame resistant mattress foundation comprising a fire resistant barrier described above enclosing a core of the mattress foundation.

A fourth aspect of the present invention relates to an open flame resistant article comprising filling materials and a fire resistant barrier described above enclosing the filling materials.

DETAILED DESCRIPTION OF THE INVENTION

Figure 1:
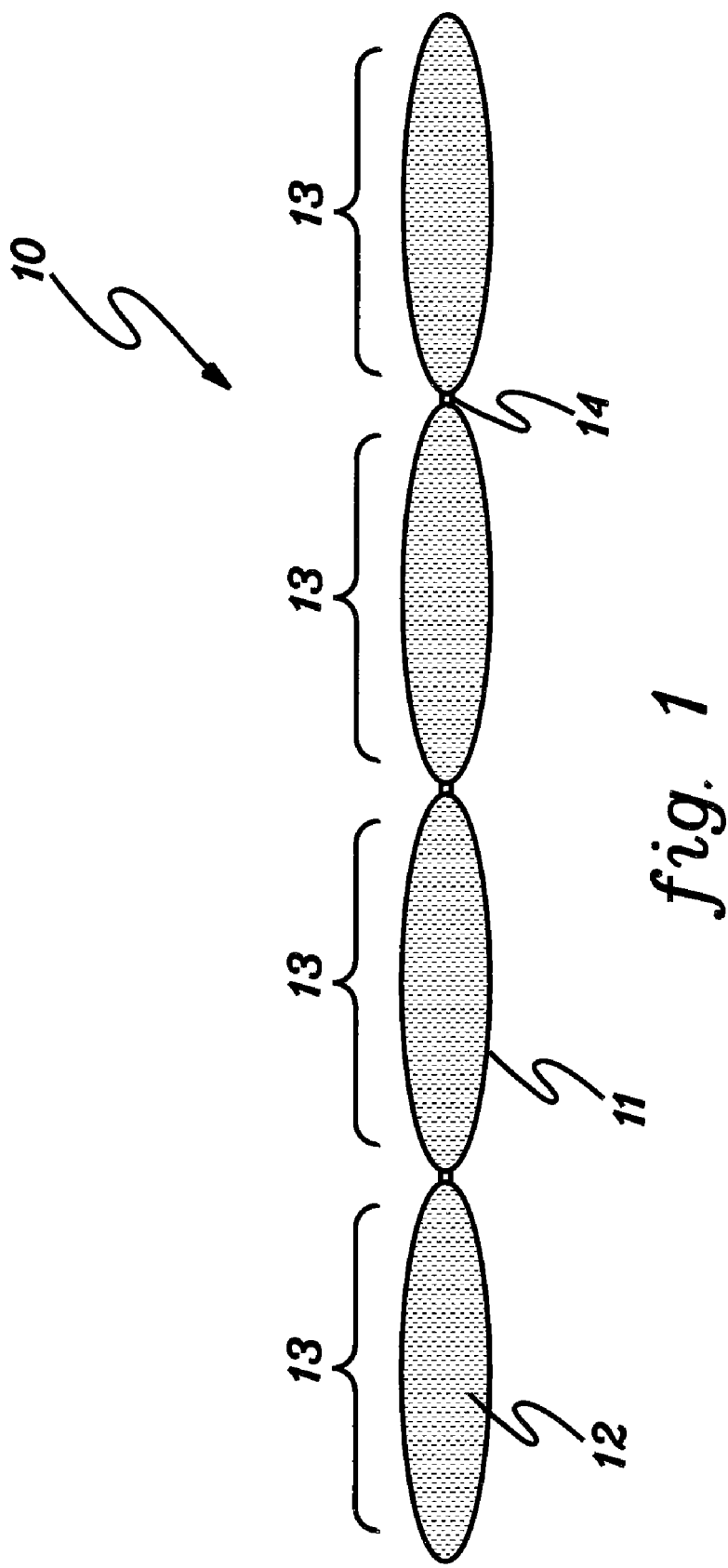
FIG. 1 depicts a cross-sectional view of a fire resistant barrier, in accordance with the present invention.

It has been unexpectedly discovered that mattresses, mattress foundations, upholstered furniture articles and other articles filled with resilient cushioning materials are rendered resistant to open flame and smoldering ignition sources when included therein is a fire resistant barrier having granular materials.

Throughout this specification the terms are defined when first introduced and retain their definitions.

A mattress and terms relating to mattresses are defined below and conform to the terms as defined by 16 C.F.R. 1632, the entire contents of which are incorporated herein by reference. Additionally, the terms defined below conform with the terms as defined in the NPR on Mattress Flammability of 16 CFR 1633 as approved by the CPSC on Feb. 16, 2006, the entire contents of which are incorporated herein by reference.

A mattress means a ticking filled with a resilient material used alone or in combination with other products intended or promoted for sleeping upon. Examples include but are not limited to adult mattresses; youth mattresses; crib mattresses such as portable crib mattresses; bunk bed mattresses; futons; water bed; and air mattresses which contain upholstery material between the ticking and the mattress core; and any detachable mattresses used in any item of upholstered furniture such as convertible sofa bed mattresses, corner group mattresses, day bed mattresses, roll-a-way bed mattresses, high risers, and trundle bed mattresses. A mattress may also be called a bed.

Examples excluded from the above definition include sleeping bags; pillows; mattress foundations; liquid and gaseous filled tickings such as water beds and air mattresses which do not contain upholstery material between the ticking and the mattress core; upholstered furniture which does not contain a detachable mattress such as chaise lounges, drop-arm love seats, press-back lounges, push-back sofas, sleep lounges, sofa beds (including jackknife sofa beds), sofa lounges (including glide-outs), studio couches and studio divans (including twin studio divans and studio beds); and juvenile product pads such as car bed pads, carriage pads, basket pads, infant carrier and lounge pads, dressing table pads, stroller pads, crib bumpers, and playpen pads.

A mattress pad means a thin, flat mat or cushion, and/or ticking filled with resilient material for use on top of a mattress. Examples include but are not limited to absorbent mattress pads, flat decubitus pads, and convoluted foam pads, which are totally enclosed in ticking. Examples excluded from the definition are convoluted foam pads, which are not totally encased in ticking.

Ticking means the outermost layer of fabric or related material that encloses the core and upholstery materials of a mattress or mattress pad. A mattress ticking may consist of several layers of fabric or related materials quilted together.

Core means the main support system that may be present in a mattress, such as springs, foam, hair block, water bladder, air bladder, or resilient filling.

Upholstery material means all material, either loose or attached, between the mattress or mattress pad ticking and the core of a mattress, if a core is present.

Tape edge (edge) means the seam or border edge of a mattress or mattress pad.

Quilted means stitched with thread or by fusion through the ticking, and one or more layers of upholstery material.

Tufted means buttoned or laced through the ticking and upholstery material and/or core, or having the ticking and upholstery material and/or core drawn together at intervals by any other method which produces a series of depressions on the surface.

A mattress foundation is any surface such as foam, box springs or other, upon which a mattress is placed to lend it support for use in sleeping upon.

An article of upholstered furniture is a resilient filling material that may optionally be supported by a frame or structure and is encased by a textile structure. The article of upholstered furniture is intended to be used for sitting or reclining but is not primarily intended for sleeping and conforms with the term as defined by the draft language of 16 C.F.R. 1634, as published by the CPSC in May 2005, the entire contents of which are incorporated herein by reference.

A filled article is resilient filling material encased in a textile structure and a bedding is a textile bedding product that is used on or in conjunction with a bed, mattress or mattress foundation and the terms relating to filled articles and bedding conform with the terms as defined by the California BHFTI draft of Technical Bulletin #604 published Oct. 1, 2004, and the ANPR for 16 CFR 1634 Standard To Address Open Flame Ignition of Bedclothes published by the CPSC in the Federal Register on Jan. 13, 2005, pages 2514 through 2517, the entire contents of which are incorporated herein by reference.

A textile structure is any type of material made from fibers or other extended linear materials such as thread or yarn. Classes of textile structures include woven fabrics, knitted fabrics, crocheted fabrics, knotted or tufted cloth and non-woven fabrics, such as felt, high loft, spunlaced, hydroentangled, airlaid or needlepunched fabrics. A textile structure also encompasses composites of multiple textile structures that may include the foregoing textile classes.

Granular means composed of or resembling granules or granulations, i.e., grain like or small particles having a minute discrete mass. The surface of the granule can be viewed as a set of all points in a three dimensional space which are at a distance r from a fixed point of that space. The fixed point is called the center. The variable r is a real positive number called the radius of the granule or granulation, and can vary in length. For example a set of points having three different r-values, $r_1$, $r_2$, and $r_3$ may be equal or not equal in length. If r has different values, for example, $r_1$ and $r_2$, then any one r-value cannot be more than ten times the value of another r-value if is to be called a granule Granular filling is a material or combination of materials that are composed of granules, grains, or discrete particles. The particles are optimally from 0.01 mm to 3.0 cm in cross section. The range of particle size may vary from a lower limit of 0.01 mm, 0.1 cm, or 0.5 cm to an upper limit of 1, 2 or 3 cm. All ranges of the particle size are inclusive and combinable. Granular implies that the discrete particles are not embedded in a matrix that immobilizes the particles. Except for the restraint of the textile structure surrounding the granules, they would be free-flowing. Because the granular filling occupies the space between the fabric layers and is not coated on the fabric or filled into the fabric, it will generally comprise a substantial portion of the barrier material. In most embodiments it will contribute more than 50% of the total weight of the entire structure. In other embodiments it will contribute 55%-90%, 60%-95%, and 70%-85% of the total weight of the entire structure.

The granular filling may be naturally occurring or man-made. Examples of naturally occurring granular filling include but are not limited to sand; soil; dirt; silica sand; crystalline silica; quarried mineral or materials such as stone, gravel, rock, and coal, recycled and secondary aggregates like (colliery spoil, china clay waste, pulverized fuel ash (PFA), and slate), marine aggregates, slag; grains and their organic matter such as rice, wheat, soy, and buckwheat hulls; dried legumes such as beans and peas; dried seeds or kernels from vegetables or grasses, and meals made there from such as corn kernels or corn meal; diatomaceous materials; and crushed fossilized materials.

Granular filling may be distinguished from powders in that powders refer to those materials that have finer grain sizes, and that therefore have a greater tendency to form clumps when flowing. As compared to granular filling which refers to the coarser granular materials that do not tend to form clumps except when wet.

A flame-resistant granular filling is a granular material that exhibits a resistance to ignition when exposed to an open flame or smoldering ignition.

Additional examples of quarried materials may be found in The Mines and Quarries Act as promulgated by the Republic of Bulgaria National Assembly Izvestiya No. 92/15.11.1957 and Amended, No. 17/1958; Amended and Supplemented Nos. 68/1959 and 104/1960 respectively; State Gazette Nos. 84/1963, 27/1973, 36/1979, 27 & 56/1986, 35/1996; the entire contents of which are incorporated herein by reference.

Examples of man-made granular filling include but are not limited to glass or ceramic materials; ball bearings made of metal, glass or ceramics; pelletized coal, or other pre-oxidized or pre-burned material; pellets or marbles of hardwood materials, or other substantially slow-to-ignite materials; and fire resistant performing fiber materials that have been configured in a pelletized or similarly granular form.

FIG. 1 depicts a cross-sectional view of a substantially flat fire resistant barrier in accordance with the present invention. Referring to FIG. 1, the barrier 10 comprises a textile structure 11 and at least one flame resistant granular filling 12. The structure 11 is flexible. That is, the structure 11 may be bent, twisted, turned, or bowed and is capable of withstanding any of the aforementioned stresses without damage to the structure 11 or any elements of the structure 11, see infra. Additionally, the structure 11 is non-metallic. The structure 11 does not have any metallic films or particles coated thereon or embedded therein. Additionally, coatings containing metallic particles are not part of or used in conjunction with the structure 11 in accordance with the present invention.

The textile structure 11 has a plurality of chambers 13 that contain the filling 12. In an embodiment the barrier 10 will have more than four such chambers 13; in another the barrier 10 will have more than eight such chambers 13; and others the barrier 10 will have more than twelve such chambers 13.

The textile structure 11 supports or encases the filling 12 within the structure 11. The chambers 13 are formed when the structure 11 has seams 14 fashioned therethrough. Chambers may also be formed with baffles, as well known in the art. The chambers 13 restrict any potential fluidization, gravitational shifting, and/or physical displacement of the filling 12 within the structure 11. The chambers 13 typically contain a gas such as air with the filling 12 dispersed therein. Any inert/non-flammable gas may be used in an embodiment of the present invention. Alternatively, the chambers 13 may contain a vacuum or an interstitial fluid also having the filling 12 dispersed therein. The interstitial fluid does not restrict the free-flowing ability of the filling 12, but provides, rather, another medium for the filling 12 to move or flow through.

The barrier is substantially flat. By substantially flat is meant that two of the three dimensions of the barrier are more than ten times the third. Typically, the length and width will be more than ten times the thickness. In one embodiment the length and width will be in a range from 11-15 times the thickness and in another, the length and width will be in a range from 14-20 times the thickness. The seams 14 can be fashioned traditionally using standard sewing techniques and standard materials, such as polyester sewing or quilting thread. Alternatively, techniques such as ultra-sonic bonding or heat sealing may be used to join the textile structure 11 to create the chambers 13 therein. The aforementioned use of seams 14 to form chambers 13 is not meant to limit the form of the textile structure 11, that is, a textile structure 11 requiring chambers 13 within. In certain circumstances, it may be desirable to forego any restriction of the movement of the filling 12 by not including chambers 13 within the structure 11 or having a number of the chambers 13 interconnected to allow move restricted movement of the filling 12.

The granular filling 12 of the present invention possess inherent flame resistant (FR) and heat resistant properties. This includes the man-made and the naturally occurring granular filling 12 described supra. The filling 12 is essentially non-combustive or it combusts at a higher threshold temperature than many synthetic or organic fibers, or materials it will be eventually used to protect, to be described infra. The granular filling 12 is located within the chambers 13 and may entirely or partially occupy the chambers 13. The filling 12 typically used is a naturally occurring material such as sand or gravel. The filing 12 and the fire resistant barrier 10 containing the filling 12 are independently able to resist an open flame under the testing conditions of California TB 117.

Some naturally occurring granular filling 12 may require or benefit from cleaning or sterilization prior to use in the fire resistant barrier 10. The aforementioned processing does physically or chemically alter the FR properties of the filling 12. In an embodiment of the present invention, where the filling 12 does not possess a sufficient level of inherent FR properties, the filling 12 may be augmented with FR properties by processing with flame retardant chemicals of the filling 12 in advance of incorporation into the fire resistant barrier 10.

Many of the naturally occurring granular filling 12 possess other desirable benefits in addition to their FR properties. Such benefits include wide availability, low toxicity profile, biodegradability, environmental renewability and sustainability, and dramatically lower costs relative to man-made materials with similar performance properties.

The construction of the fire resistant barrier 10 of the present invention is not intended to limit the many ways that the granular filling 12 may be used with the barrier 10. The central design parameter that should be sought is one in which the filling 12 is placed in a position within the barrier 10 to isolate potential fuel loads from ignition sources. Because granular fillings 12 can be selected that are essentially non-combustive or that combust at higher threshold temperatures than many synthetic or organic fibers, the present invention seeks to dispose barriers comprised of granular filling 12 in a position within the barrier 10 and in conjunction with a mattress, a mattress foundation, a mattress set, an upholstered furniture article and the like that is determined to balance the desired comfort elements of the aforementioned with the required flammability protection.

Figure 2:
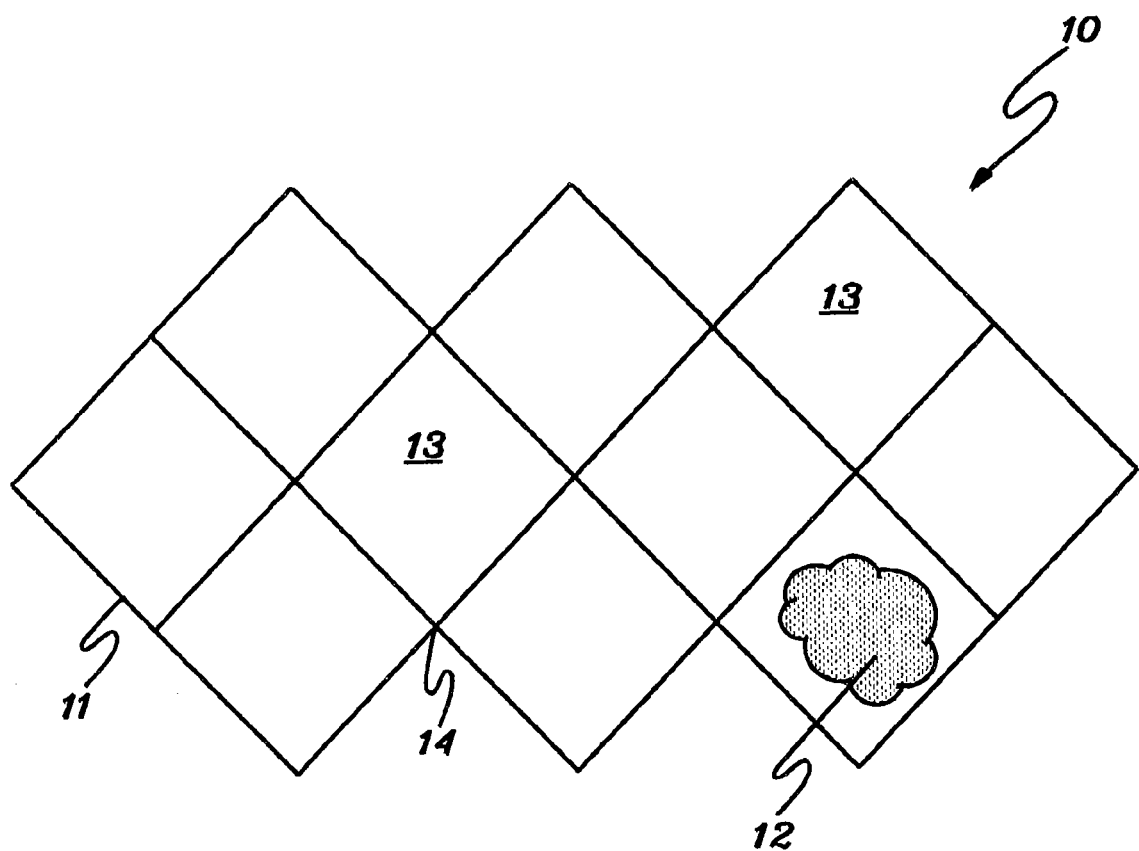
FIG. 2 depicts a cross-sectional view of a multi-layer fire resistant barrier, in accordance with the present invention.

FIG. 2 depicts a top view of the substantially flat fire resistant barrier 10 in accordance with the present invention. Referring to FIG. 2, the barrier 10 comprises the same elements as described supra; a textile structure 11, a flame resistant granular filling 12, a plurality of chambers 13, and seams 14. The pattern (diamonds) of chambers 13 in the present example is chosen for aesthetic purposes and is not considered to have any potential impact on the performance of the fire resistant barrier 10. Any pattern of chambers 13 can be selected, such as ovals, triangles, rectangles, decorative patterns, and combinations thereof without compromising the fire resistant performance characteristics of the barrier 10. Additionally, patterns chambers 13 may be selected to enhance shallow regions of filling 12, as described infra.

Figure 3:
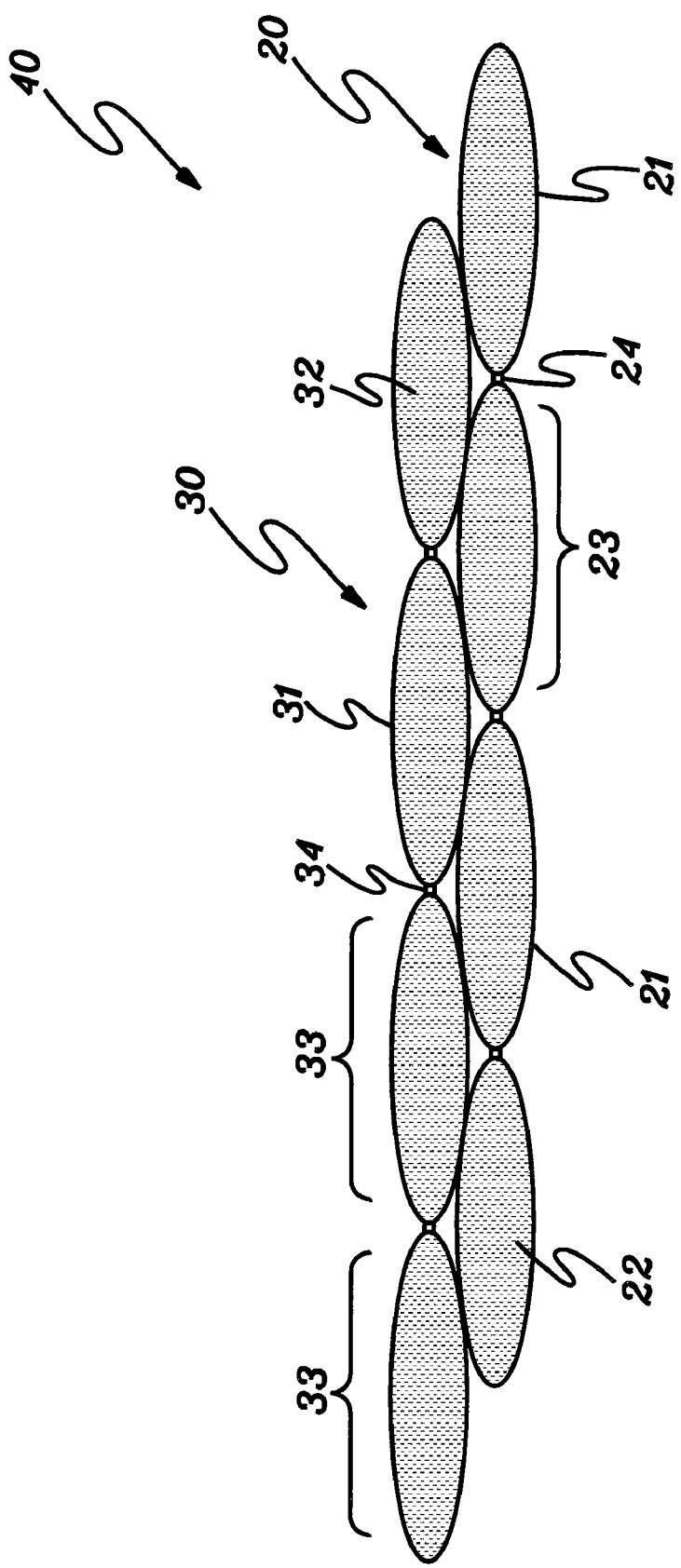
FIG. 3 depicts a top view of the fire resistant barrier, in accordance with present invention.
Figure 4:
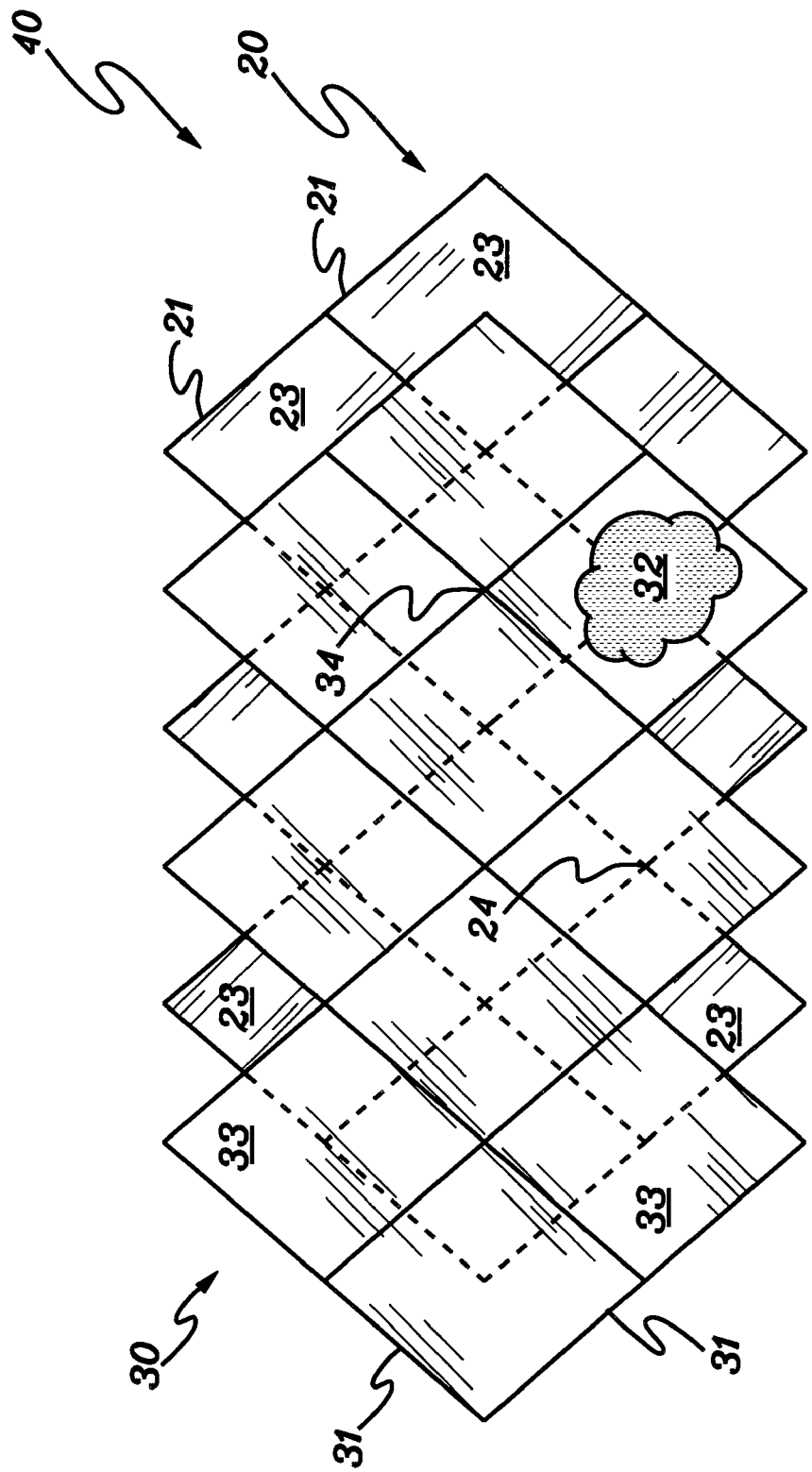
FIG. 4 depicts a top view of the multi-layer fire resistant barrier, in accordance with the present invention.

FIG. 3 depicts a cross-sectional view of a multi-layer fire resistant barrier and FIG. 4 depicts a top view of the multi-layer fire resistant barrier in accordance with the present invention. An embodiment of the present invention is the use of individual substantially flat fire resistant barriers to form a multi-layer fire resistant barrier. Referring to FIG. 3 and FIG. 4, a multi-layer fire resistant barrier 40 comprising two fire resistant barriers, 20 and 30, is presented. The fire resistant barriers 20 and 30 include the same elements as the fire resistant barrier 10 described supra. Each barrier, 20 and 30, comprises a textile structure, 21 and 31, flame resistant granular filling, 22 and 32, a plurality of chambers, 23 and 33, and seams, 24 and 34, respectively.

In the multi-layer barrier 40, the barriers 20 and 30 are not placed on top of each other with the seams, 24 and 34, aligned with each other. But placed in such a manner that the seams, 24 and 34, are not aligned with each other. Typically the seams, 24 and 34, are located in the middle of a chamber, 23 and 33, directly above or below a particular chamber of a barrier 20 or 30. This layering methodology recognizes that the use of seams, 24 and 34, in the textile structures, 21 and 31, can create shallow regions of filling where each seam occurs. By staggering the alignment of the seams, 24 and 34, with each other, higher/thicker regions of filling of one barrier can be matched with lower/thinner regions of filling of another barrier, above or below.

The aforementioned description of a multi-layer fire resistant barrier comprising two individual fire resistant barriers is not meant to limit the number of individual fire resistant barriers that may be used in an embodiment of the present invention. Any number of individual fire resistant barriers may be used to form a multi-layer fire resistant barrier that can resist an open flame under the testing conditions of California TB 117. In one embodiment, the number of individual fire resistant barriers that may be used to form a multi-layer fire resistant barrier is in a range from 1-20 layers. The number of layers may vary from a lower limit of 1, 2, or 3 to an upper limit of 18, 19, or 20. All ranges of the number of layers are inclusive and combinable.

Figure 5:
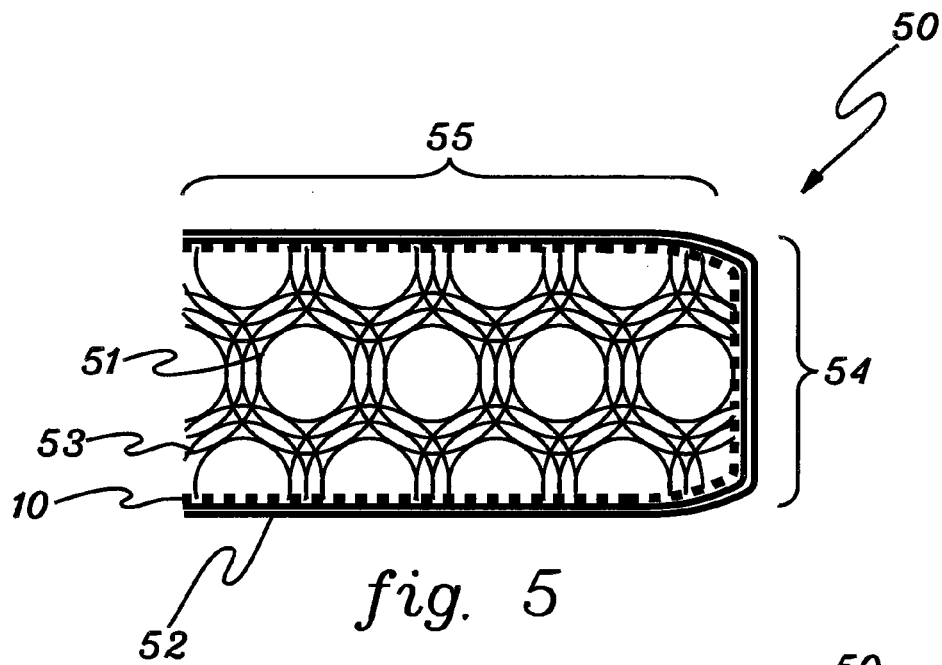
FIG. 5 depicts a cross-sectional view of an open flame resistant mattress, in accordance with the present invention.

FIG. 5 depicts a cross-sectional view of an open flame resistant mattress in accordance with the present invention. Referring to FIG. 5, the open flame resistant mattress 50 comprises a substantially flat fire resistant barrier 10 that encloses a core 51 of the mattress 50. The barrier 10 and its elements have been previously described supra and are the same when used with the mattress 50. The mattress 50 additionally comprises a ticking 52 and a ticking filling 53.

The mattress 50 and most mattresses in general contain a core 51 typically having a resilient cushioning material such as foam, fiber, fabrics, innersprings, and combinations thereof. The core 51 then is built-up with additional ticking filling 53 materials. An example of ticking filling 53 is polyester fiber fill. Other fillings 53 such as battings made of natural or organic fibers, or polyurethane, latex or viscoelastic foam may be used as is customary in mattress manufacturing and known to those ordinarily skilled in the art.

The core 51 and optional ticking filling 53 are partially or entirely enclosed by the fire resistant barrier 10 in the panel region 54 and the border region 55 of the mattress 50. The barrier 10 may be one continuous layer within the mattress 50, encompassing the regions 54 and 55, or may be present as discontinuous sections in the panel region 54 and/or the border region 55. When the barrier 10 is present as discontinuous sections, the sections may comprise identical granular filling 12 or independently comprise different granular filling 12 in an embodiment of the present invention. Additionally, when the barrier 10 is present as discontinuous sections, the closure or interconnection of the sections may be accomplished in any manner suitable to ensure that the closure method does not compromise the performance of the barrier when tested for performance against open flame tests. A ticking 52 then surrounds the core 51, the ticking filling 53, and the fire resistant barrier 10.

The open flame resistant mattress 50 having the fire resistant barrier 10 therein may have its resistance to ignition after exposure to an open flame determined by full-scale testing in accordance with NFPA 267, 2003 edition, ASTM E 1590, TB 129, TB 603, or the proposed standard 16 CFR 1633. Test protocols of each of the aforementioned standards are publicly available and the entire contents of each test are incorporated herein by reference. Results of testing the mattress 50 according to such test protocols typically show a maximum heat release rate of less than 250 kW and a total energy release of less than 40 MJ in the first five minutes of each test, see testing examples described infra.

In an embodiment of the present invention, it can be envisioned that better testing results may be obtained by altering the design of the fire resistant barrier. For example, to include a greater mass of granular filling, thereby increasing the protective capability of the barrier and delivering improved testing results without otherwise changing the type of filling used. Alternatively, the fire resistant barrier may be altered to include multiple layers of filling that would be equivalent to one layer having an increased mass of filling.

It can be envisioned that test results such as a maximum heat release rate of less than 100 kW, total heat release of less that 25 MJ in the first ten minutes of the test, and weight loss due to combustion of less than 3 pounds in the first ten minutes of the test can be achieved by the modifications described above. Improved test results may be attributable to a number of variables due to the complex dynamics inherent in the fire resistant barrier and articles having the barrier incorporated therein.

Additionally, the open flame resistant mattress 50 meets the smoldering resistance standard as required by the Cigarette Ignition Standard 16 CFR Part 1632. The entire content of the test protocol is incorporated herein by reference.

Figure 6:
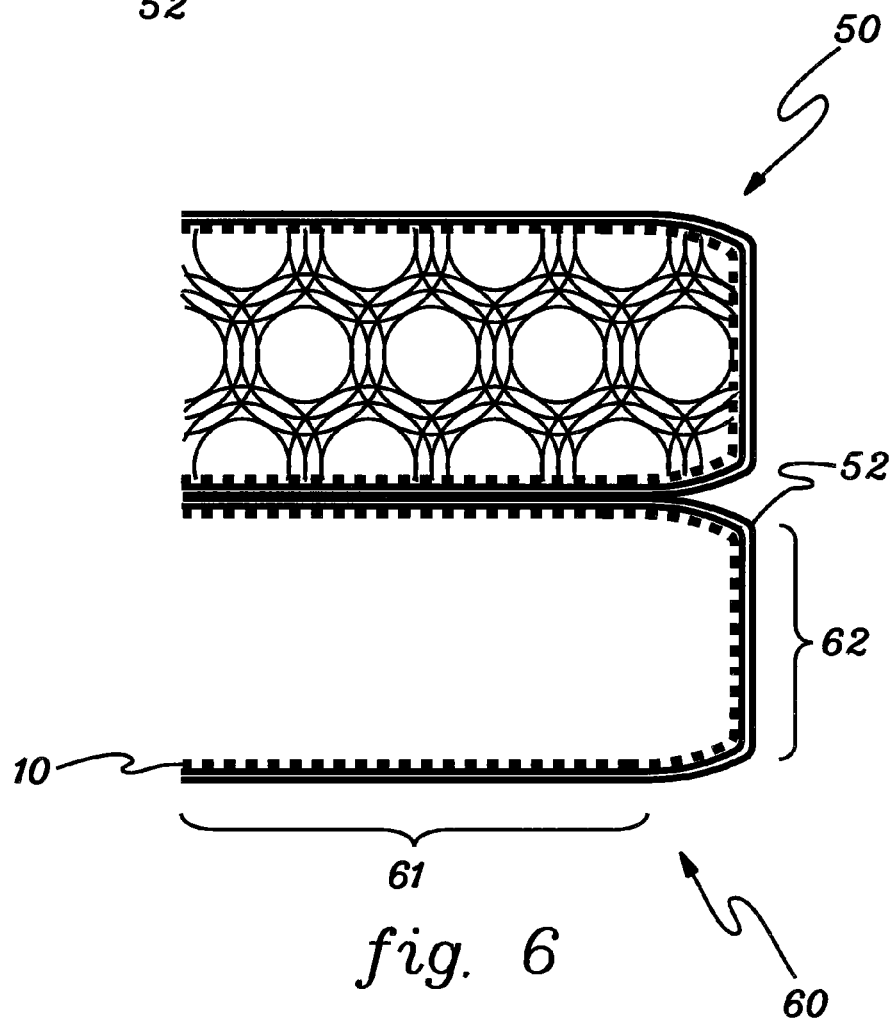
FIG. 6 depicts a cross-sectional view of an open flame resistant mattress and an open flame resistant mattress foundation, in accordance with the present invention.

FIG. 6 depicts a cross-sectional view of an open flame resistant mattress and an open flame resistant mattress foundation in accordance with the present invention. The mattress and mattress foundation together form what is referred to as an open flame resistant mattress set. Referring to FIG. 6, the open flame resistant mattress 50 and its elements have been previously described supra and are the same when used with the open flame resistant mattress foundation 60. As with the mattress 50 described supra, the barrier 10 may be one continuous layer within the foundation 60, encompassing the regions 61 and 62, or may be present as discontinuous sections in the panel region 61 and/or the border region 62.

When the barrier 10 is present as discontinuous sections, the sections may comprise identical granular filling 12 or independently comprise different granular filling 12 in an embodiment of the present invention. Additionally, when the barrier 10 is present as discontinuous sections, the closure or interconnection of the sections may be accomplished in any manner suitable to ensure that the closure method does not compromise the performance of the barrier when tested for performance against open flame tests. It is important to note that the barrier 10 need not completely encapsulate either the mattress or the mattress foundation core structures.

Other design considerations may have to be taken into account by the mattress, mattress foundation, or cushion designer relative to the nature of the fuel load to be protected such as their placement and composition in order to design the optimum placement for the barrier 10 within the aforementioned. The foundation 60 having the fire resistant barrier 10 therein may have its resistance to ignition after exposure to an open flame determined by full-scale testing in accordance with NFPA 267, 2003 edition, ASTM E 1590, TB 129, TB 603, or the proposed standard 16 CFR 1633.

In an embodiment of the present invention, the fire resistant barrier 10 may be incorporated in an article of upholstered furniture during the original manufacture of the article. Typically, the fire resistant barrier 10 is disposed behind the decorative exterior upholstery fabric that is the outermost element of the article of furniture. Alternatively, the ticking filling 53 or resilient cushioning materials may be placed between the barrier 10 and the outermost exterior upholstery fabric. The amount of material placed between the barrier 10 and the exterior upholstery fabric is typically a quantity so as to not adversely impact the fire resistant performance of the upholstered article. If a large amount of the material is placed between the barrier 10 and the exterior upholstery fabric, the barrier 10 may be modified, as described supra, to increase its fire resistant capability.

Resistance of the encased article of upholstered furniture to ignition after exposure to an open flame may be determined by full-scale testing in accordance with California Technical Bulletin 133, TB 117, ASTM E-1537, NFPA 266 or the methods outlined in the CPSC Staff Draft Standard for Upholstered Furniture Flammability (May 2005), to assess performance of full-scale composite furniture items and mock-ups against open flame ignition sources.

As demonstrated in the testing of an open flame resistant mattress having the fire resistant barrier therein (see above), it would be expected that an upholstered furniture having the same fire barrier would have similar testing results. Testing an upholstered furniture article according to the present invention according to such test protocols would be expected to show a maximum heat release rate of less than 250 kW and a total energy release of less than 40 MJ in the first five minutes of each test.

In an embodiment of the present invention, it can be envisioned that better testing results may be obtained by altering the design of the fire resistant barrier incorporated in the upholstered furniture. For example, to include a greater mass of granular filling, thereby increasing the protective capability of the barrier and delivering improved testing results without otherwise changing the type of filling used. Alternatively, the fire resistant barrier may be altered to include multiple layers of filling that would be equivalent to one layer having an increased mass of filling.

It can be envisioned that test results such as a maximum heat release rate of less than 100 kW, total heat release of less that 25 MJ in the first ten minutes of the test, and weight loss due to combustion of less than 3 pounds in the first ten minutes of the test can be achieved by the modifications described above. Improved test results may be attributable to a number of variables due to the complex dynamics inherent in the fire resistant barrier and upholstered furniture having the barrier incorporated therein.

The fire resistant barrier 10 as presented is typically incorporated with mattresses, mattress foundations, upholstered articles, and other bedclothes at the time of original manufacture. Incorporation of the barrier 10 at the time of original manufacture is not meant to limit the use of the barrier 10 in an embodiment of the present invention. The barrier 10 also may be used with a mattress, a mattress foundation, an upholstered article, and other bedclothes post-manufacture, i.e., as a retrofit cover/device, in accordance with the present invention.

A retrofit cover that is consumer and user installable comprises a fire resistant barrier 10 that functions to protect a mattress, a mattress foundation, upholstered article, or bedclothes from fire by creating a substantially non-burning or slow-burning barrier that isolates a fuel load from an ignition source. The retrofit cover may also incorporate other performance enhancing or finishing elements, such as treatments or preparations that are anti-microbial, antifungal, anti-acaral, or anti-bacterial in nature. Other finishing chemicals like antistatic, dyestuffs, water and oil repellents, surfactants, and other treatments incorporated with the barrier 10. It is not necessary though to use auxiliary finishing treatments. The barrier 10 may simply be used in its unaltered state without detriment to its fire resistant performance.

A consumer may own a mattress or foundation or set that was built prior to enactment of any law or regulation that would require the mattress or foundation or set of bedding to meet a full-scale open flame standard, e.g., TB 603, 16 CFR 1633, etc but has not yet degraded in terms of comfort to require a new purchase. Rather than purchase a new mattress, mattress foundation, or set (at substantial cost) that would meet a higher FR performance level, the consumer would purchase a retrofit cover or kit that would include at least the fire resistant barrier 10. The kit could additionally include a cushioning element to offset any degradation of the article to be retrofitted, depending on the age of the unit.

The kit is user installable. It includes a zipper or hook & loop closure system. The opening of the cover and method of closure is designed to withstand an ignition insult. The cover is tailored with expansion capabilities in the vertical direction, i.e., the sides of the cover are capable of expanding (for installation) and contracting (to fit snugly once installed) to incorporate differing thicknesses of mattresses and/or mattress foundations. The footprint of the units is standard—Twin 39.5"×75", Full 54"×75" (Xtra Long versions of Twin and full are 80") Queen 60"×80" King 78"×80", etc.) The outer appearance of the retrofit cover can mimic the typical appearance of mattresses, e.g., patterns, damasks, etc. Although, the retrofit cover can allow the consumer to completely change the outward appearance if they so chose.

The fire resistant barrier having flame resistant granular filling according to the present invention may also be used in other applications where it is desired to protect an upholstered or otherwise padded or filled article from heat of flames. Examples of applications transportation and health care seating systems, where filling materials may be partly or completely enclosed by a fire barrier according to the invention. Transportation seating systems include seats for airplanes, trains and buses and health care seating systems include seats or cushions for wheelchairs. Another example is protective apparel, such as firefighter turnout gear, where a fire barrier fabric may cover the granular filling. It is typical that the evaluation of the flammability be made through full-scale testing, however the lack of conducting of such testing is not intended to serve a limitation of the present invention.

EXAMPLES

Example 1

Full-Scale Open Flame Testing Procedure

Three mattresses measuring 72"×36"×6" were fashioned.

In each case a mattress core comprised of polyurethane foam material was selected to build a mattress.

A standard fire barrier fabric comprised of woven fiberglass and needled FR fibers were adhered to the bottom and side surfaces of the mattress core—the bottom panel and the border surface.

One of the mattress cores was selected at random to be the "control" specimen. This core was covered with a an outer ticking comprised of a "sherpa" knit fabric comprised of 75% Cotton and 25% polyester and a basis weight of approximately 13 ounces per square yard. The outer ticking was fashioned in two separate parts that were joined by a zipper that transited the entire circumference of the prototype units. This mattress was identified as Model GMC.

Each of the remaining two mattress cores had 50 pounds of granular filling (Lighthouse™ Brand Playsand as manufactured by U.S. Silica Corp) placed loosely on the top panel surface of the foam core. The sand was screened to an approximate uniform depth of ⅛-¼" across the entire horizontal plane of the mattress with care taken to ensure that coverage of the granular filling extended to the edges.

One of the two specimens, which had the granular filling, was then covered with the sherpa ticking cover so that the granular material was in direct contact with the sherpa ticking cover. This specimen was identified as Model GM1.

The second specimen had a standard foam topper measuring 72"×36"×¼" placed atop the granular material and then the sherpa ticking cover was installed and closed with the zipper. This specimen was identified as Model GM2.

The mattresses were tested in accordance with California Technical Bulletin 603, Option C Room Configuration. The test was performed without bedding. All instrumentation was zeroed, and calibrated prior to testing. The test specimen, after conditioning for 48 hours at 70° F.+/−5° F. and no more than 55% Relative Humidity, was placed on a metal test frame. The test was conducted according to the test protocol of TB 603.

Data recorded included: room smoke opacity; weight loss; smoke release rate (SRR); total smoke release (TSR); carbon monoxide concentration; heat release rate (HRR); total heat release (THR); ceiling temperature above specimen; and temperature at 4 feet above floor, 3 feet out from center of specimen

TABLE 2

TB 603 Test Results - Full-scale Mattress

| Example No. | Description of Specimen | | | Results | Comments |
|---|---|---|---|---|---|
| | Granular Filling | Mattress Core Type | Foam Toppers | | |
| GMC | None | Polyurethane foam core | None | FAIL | Ceiling Temp Max - 788° F. Peak Heat Release - >200 kW Flashover Total Heat Release (1$^{st}$ 10 Min) - Not Measured Flashover |
| GM1 | Sand | Polyurethane foam core | None | PASS | Ceiling Temp Max - 195° F. Peak Heat Release - 118 kW Total Heat Release (1$^{st}$ 10 Min) - 6.9 MJ |
| GM2 | Sand | Polyurethane foam core | ¼" Thick | PASS | Ceiling Temp Max - 197° F. Peak Heat Release - 59 kW Total Heat Release (1$^{st}$ 10 Min) - 16.0 MJ |

The granular filling in the above examples was loosely applied to the tested specimens. The performance of the control (GMC) when compared to the performance of specimens GM1 and GM2 clearly demonstrates the beneficial contribution made by the granular filling.

The present invention however recognizes that such a simplistic installation of the granular material would not necessarily be commercially attractive. The use of the foam topper outside of the placement of the sand was done to demonstrate that an increased mass of flammable material can be used outside of the protective shell of the granular material without degrading the fire barrier performance to the point that the test standard cannot be passed. This capability of the granular filling demonstrates that the filling can be contained in or supported by a standard, non-flammability enhanced textile structure thus improving the commercial feasibility of using such materials while still achieving compliance with the test standard.

What is claimed is:

1. An open flame resistant mattress comprising:
    a substantially flat fire resistant barrier enclosing a core of the mattress; and
    wherein the fire resistant barrier comprises:
        a textile structure having a plurality of chambers; and
        at least one flame resistant granular filling within the chambers.

2. An open flame resistant mattress according to claim 1, wherein the textile structure comprises knitted fabrics, woven fabrics, or non-woven fabrics, and combinations thereof.

3. An open flame resistant mattress according to claim 1, wherein the flame resistant granular filling is selected from the group consisting of sand, silica, quarried minerals, grains, dried legumes, dried vegetable seeds, dried vegetable kernels, diatomaceous materials, crushed fossilized minerals, and combinations thereof.

4. An open flame resistant mattress according to claim 1, wherein the flame resistant granular filling is selected from the group consisting of glass materials, ceramic materials, hardwood materials, and combinations thereof.

5. An open flame resistant mattress according to claim 1, wherein the barrier resists an open flame under conditions of California TB 117.

6. An open flame resistant mattress according to claim 1, wherein the flame resistant granular filling resists an open flame under conditions of California TB 117.

7. An open flame resistant mattress according to claim 1, wherein the chambers contain a vacuum, a gas, or an interstitial fluid with the flame resistant granular filling dispersed therein.

8. An open flame resistant mattress according to claim 1, wherein the textile structure is flexible.

9. An open flame resistant mattress according to claim 1, wherein the textile structure is non-metallic.

10. An open flame resistant mattress according to claim 1, wherein the mattress, when tested in accordance with 16 CFR 1633, has a maximum heat release rate of less than 200 kW and a total energy release of less than 25 MJ in the first five minutes of the test.

11. An open flame resistant mattress according to claim 1, wherein the mattress meets the smoldering resistance standard as required by the Cigarette Ignition Standard 16 CFR Part 1632.

12. An open flame resistant mattress according to claim 1, wherein the mattress, when tested in accordance with ASTM E 1590, has a maximum heat release of less than 250 kW and a total energy release of less than 40 MJ in the first five minutes of the test.

13. An open flame resistant mattress according to claim 1, wherein the mattress, when tested in accordance with California TB 603, has a maximum heat release of less than 200 kW and a total energy release of less than 25 MJ in the first five minutes of the test.

14. An open flame resistant mattress according to claim 1, wherein the fire resistant barrier fully encloses the core of the mattress.

15. The open flame resistant mattress according to claim 1, wherein the fire resistant barrier partially encloses the core of the mattress.

16. An open flame resistant mattress foundation comprising:
   a substantially flat fire resistant barrier enclosing a core of the mattress foundation; and
   wherein the fire resistant barrier comprises:
      a textile structure having a plurality of chambers; and
      at least one flame resistant granular filling within the chambers.

17. An open flame resistant mattress foundation according to claim 16, wherein the mattress foundation, when tested in accordance with 16 CFR 1633, has a maximum heat release rate of less than 200 kW and a total energy release of less than 25 MJ in the first five minutes of the test.

18. An open flame resistant mattress foundation according to claim 16, wherein the mattress foundation, when tested in accordance with TB 603, has a maximum heat release rate of less than 200 kW and a total energy release of less than 25 MJ in the first five minutes of the test.

19. An open flame resistant mattress foundation according to claim 16, wherein the mattress foundation, when tested in accordance with ASTM E 1590, has a maximum heat release rate of less than 250 kW and a total energy release of less than 40 MJ in the first five minutes of the test.

20. An open flame resistant mattress foundation according to claim 16, wherein the fire resistant barrier partially encloses the mattress foundation.

21. An open flame resistant mattress foundation according to claim 16, wherein the fire resistant barrier fully encloses the mattress foundation.

22. An open flame resistant mattress foundation according to claim 16, wherein the textile structure comprises knitted fabrics, woven fabrics, or non-woven fabrics, and combinations thereof.

23. An open flame resistant mattress foundation according to claim 16, wherein the flame resistant granular filling is selected from the group consisting of sand, silica, quarried minerals, grains, dried legumes, dried vegetable seeds, dried vegetable kernels, diatomaceous materials, crushed fossilized minerals, and combinations thereof.

24. An open flame resistant mattress foundation according to claim 16, wherein the flame resistant granular filling is selected from the group consisting of glass materials, ceramic materials, hardwood materials, and combinations thereof.

25. An open flame resistant mattress foundation according to claim 16, wherein the barrier resists an open flame under conditions of California TB 117.

26. An open flame resistant mattress foundation according to claim 16, wherein the flame resistant granular filling resists an open flame under conditions of California TB 117.

27. An open flame resistant mattress foundation according to claim 16, wherein the chambers contain a vacuum, a gas, or an interstitial fluid with the flame resistant granular filling dispersed therein.

28. An open flame resistant mattress foundation according to claim 16, wherein the textile structure is flexible.

29. An open flame resistant mattress foundation according to claim 16, wherein the textile structure is non-metallic.

30. An open flame resistant mattress set comprising:
   a mattress and a mattress foundation each independently comprising a substantially flat fire resistant barrier; and
   wherein the fire resistant barrier comprises:
      a textile structure having a plurality of chambers; and
      at least one flame resistant granular filling within the chambers.

31. A mattress set according to claim 30, wherein the mattress set, when tested in accordance with 16 CFR 1633, has a maximum heat release rate of less than 200 kW and a total energy release of less than 25 MJ in the first five minutes of the test.

32. A mattress set according to claim 30, wherein the mattress set, when tested in accordance with TB 603, has a maximum heat release rate of less than 200 kW and a total energy release of less than 25 MJ in the first five minutes of the test.

33. A mattress set according to claim 30, wherein the mattress set, when tested in accordance with ASTM E 1590, has a maximum heat release rate of less than 250 kW and a total energy release of less than 40 MJ in the first five minutes of the test.

34. A mattress set according to claim 30, wherein the fire resistant barrier partially encloses a core of the mattress and a core of the mattress foundation.

35. A mattress set according to claim 30, wherein the fire resistant barrier fully encloses a core of the mattress and a core of the mattress foundation.

36. A mattress set according to claim 30, wherein the textile structure comprises knitted fabrics, woven fabrics, or non-woven fabrics, and combinations thereof.

37. A mattress set according to claim 30, wherein the flame resistant granular filling is selected from the group consisting of sand, silica, quarried minerals, grains, dried legumes, dried vegetable seeds, dried vegetable kernels, diatomaceous materials, crushed fossilized minerals, and combinations thereof.

38. A mattress set according to claim 30, wherein the flame resistant granular filling is selected from the group consisting of glass materials, ceramic materials, hardwood materials, and combinations thereof.

39. A mattress set according to claim 30, wherein the barrier resists an open flame under conditions of California TB 117.

40. A mattress set according to claim 30, wherein the flame resistant granular filling resists an open flame under conditions of California TB 117.

41. A mattress set according to claim 30, wherein the chambers contain a vacuum, a gas, or an interstitial fluid with the flame resistant granular filling dispersed therein.

42. A mattress set according to claim 30, wherein the textile structure is flexible.

43. A mattress set according to claim 30, wherein the textile structure is non-metallic.

* * * * *